United States Patent [19]

Brown et al.

[11] Patent Number: 5,182,243
[45] Date of Patent: Jan. 26, 1993

[54] PROCESS FOR PREPARING FLUIDIZED CRACKING CATALYSTS FROM EQUILIBRIUM FLUIDIZED CRACKING CATALYSTS

[75] Inventors: Stephen H. Brown, Princeton; Roland von Ballmoos, Belle Mead, both of N.J.

[73] Assignee: Englehard Corporation

[21] Appl. No.: 786,663

[22] Filed: Nov. 1, 1991

[51] Int. Cl.⁵ .............................................. B01J 29/08
[52] U.S. Cl. .................................. 502/79; 502/22; 502/25; 502/64; 423/709; 423/DIG. 21
[58] Field of Search ................... 502/22, 24, 25, 79, 502/64, 85; 423/328, 329

[56] References Cited

U.S. PATENT DOCUMENTS

| | | | |
|---|---|---|---|
| 3,777,006 | 12/1973 | Rundell et al. | 423/118 |
| 4,309,313 | 1/1982 | Barrett et al. | 423/329 |
| 4,482,530 | 11/1984 | Sanders et al. | 502/79 |
| 4,550,090 | 10/1985 | Degnan et al. | 502/25 |
| 4,631,262 | 12/1986 | Altomare | 502/65 |
| 4,784,980 | 11/1988 | Bertolacini et al. | 502/25 |
| 5,001,094 | 3/1991 | Chang et al. | 502/65 |

*Primary Examiner*—Anthony McFarlane

[57] ABSTRACT

A process for the reuse or recycling of FCC equilibrium catalysts is disclosed. The process involved treatment of a zeolite-containing equilibrium catalyst with clear seeds, a source of sodium oxide, a source of silica and water at elevated temperatures in order to destroy the Y originally present in the equilibrium catalyst and regrow zeolite Y in the pores of the matrix to a level no higher than 70 weight percent.

4 Claims, 2 Drawing Sheets

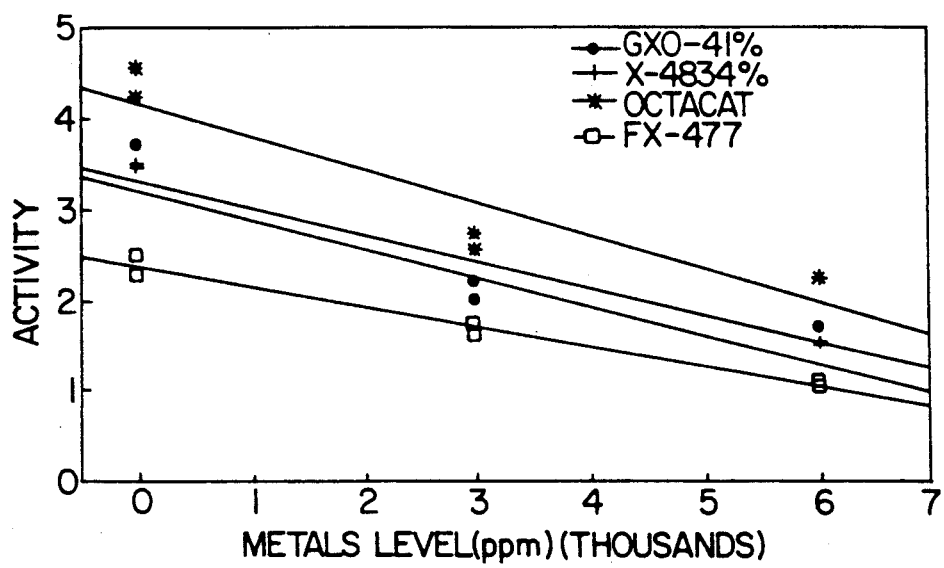
F I G. 1
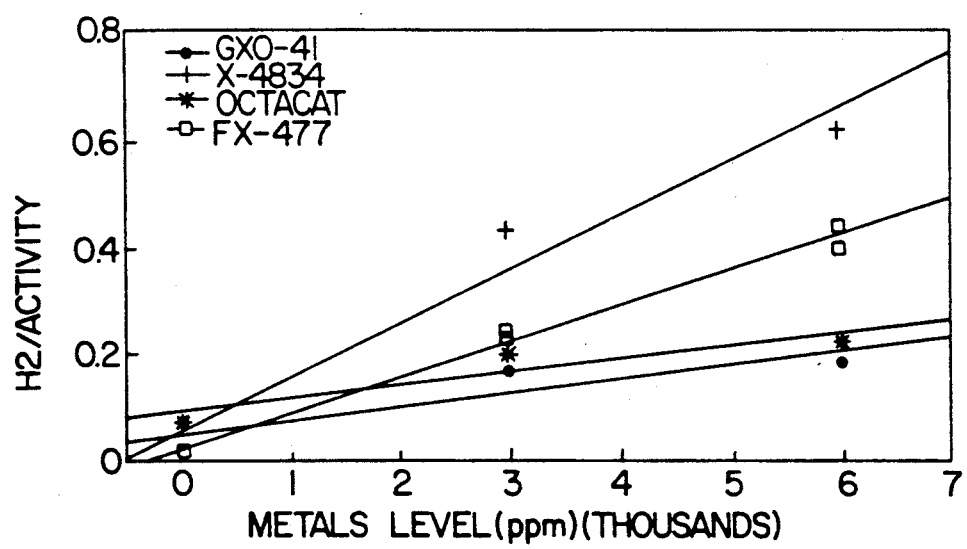
F I G. 2

PROCESS FOR PREPARING FLUIDIZED CRACKING CATALYSTS FROM EQUILIBRIUM FLUIDIZED CRACKING CATALYSTS

BACKGROUND OF THE INVENTION

The use of fluidized cracking catalyst (FCC) containing zeolite Y in order to crack gas oils into various products, including gasoline and fuel oil, is widely practiced commercially. In catalytic cracking an inventory of particulate catalyst is continuously cycled between a cracking reactor and a catalyst regenerator. In a fluidized catalytic cracking (FCC) system, a stream of hydrocarbon feed is contacted with fluidized catalyst particles in the hydrocarbon cracking zone, or reactor, at a temperature of about 425°-600° C., usually 460°-560° C. The reactions of hydrocarbons at the elevated operating temperature result in deposition of carbonaceous coke on the catalyst particles. The resulting fluid products are separated from the deactivated, spent catalyst and are withdrawn from the cracking reactor. The spent catalyst particles, containing a substantial concentration of coke, are stripped of volatiles, usually by means of steam, and are then passed to the catalyst regenerator. In the regeneration zone, the coked catalyst is contacted with a predetermined amount of oxygen-containing gas. A desired portion of the coke is burned off the catalyst, simultaneously restoring catalyst activity and heating the catalyst to a higher temperature required for use in the cracking zone, e.g., 540°-815° C., usually 590°-730° C. Flue gas is formed by combustion of the coke in the regenerator. The flue gas may be treated for removal of particulates and conversion of carbon monoxide, after which it is normally discharged into the atmosphere.

The activity of a cracking catalyst is an important parameter in catalytic cracking operations. A standard measure of the activity of a cracking catalyst is the degree of conversion which can be obtained using the catalyst in a cracking operation. The degree of conversion may be defined as the volume percent of fresh hydrocarbon feed having a normal boiling point of at least 221° C. which is changed to gasoline and lighter hydrocarbon products during the cracking conversion step, where the end point of gasoline for the purpose of determining conversion may be defined as 220° C. In addition to being a measure of catalyst activity, the conversion obtained with the catalyst can also be used as a measure of the severity of a cracking operation, so the activity of a catalyst is determined by conversion at a predetermined, standard set of operating conditions. At a given set of operating conditions, a more active catalyst gives a greater conversion than does a less active catalyst. Increased conversion is a desirable attribute in a cracking catalyst. Higher conversion allows flexible operation of a cracking unit. For example, when conversion is raised, feed throughput can be increased, or a higher degree of feed conversion can be maintained with a constant feed throughput.

Because of catalyst attrition, imperfect gas-solids separation, etc., catalyst in a cracking unit is continuously being lost from the circulating inventory. The desired catalyst inventory level is conventionally maintained by constant addition of fresh, or rejuvenated, make-up catalyst. Accordingly, the catalyst inventory in a given FCC unit is a mixture of particles which have been in use for widely varying periods, and which contain varying amounts of coke and contaminants such as metals. The mixture of catalyst particles forming the inventory during normal unit operation is referred to as "equilibrium catalyst". The activity of catalyst used in commercial cracking units is generally measured on the basis of the average activity of the equilibrium catalyst. Fresh cracking catalyst is known to possess a much higher activity than equilibrium catalyst or catalyst which has been used in a cracking operation for a relatively short time.

As can be appreciated, the disposal of equilibrium catalysts presents serious environmental problems since they contain appreciable amounts of heavy metals such as nickel and vanadium and since large amounts must be handled.

Various proposals have been presented for dealing with such spent catalyst. The vast majority of proposals are concerned with preserving the crystallinity of zeolite Y while rejuvenating or reactivating the same by various treatments. Other proposals involve converting zeolite Y into another zeolite such as zeolite A.

U.S. Pat. No. 4,784,980, the entire disclosure of which is incorporated herein by reference, deals with the latter approach while also disclosing prior art techniques directed towards the former approach.

British Patent 1,342,977 discloses the conversion of equilibrated cracking catalysts into zeolite Y.

BRIEF DESCRIPTION OF THE DRAWINGS

FIGS. 1-4 are plots of catalytic performance of the products of Examples 33-35 compared with a commercial catalyst.

SUMMARY OF THE INVENTION

Figure 3:
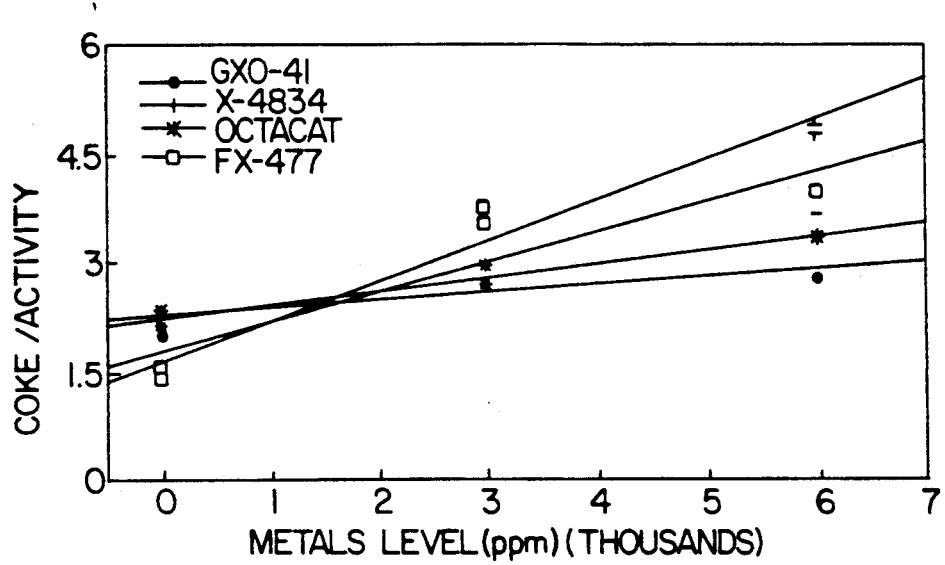

This invention is concerned with the conversion of FCC equilibrium catalysts into FCC catalysts of acceptable activity and selectivity while maintaining the physical characteristics of the FCC catalysts.

As is well known in the art, an FCC catalyst must have certain physical properties in order to be operative commercially. Such physical properties include, but are not limited to, attrition resistance, porosity and particle size. Thus, a zeolite having a fine particle size, such as a powder, cannot be used in FCC operations without modifying the same by the addition of a binder and conversion into a particle size suitable for FCC by techniques such as spray-drying. These processing steps are complex and expensive.

Thus, the instant invention is not concerned with the conversion of an FCC equilibrium catalyst into a zeolite powder but is, indeed, concerned with the conversion of an equilibrium FCC catalyst into an FCC catalyst containing zeolite Y, while preserving the physical properties which make the same suitable in an FCC operation.

DETAILED DESCRIPTION OF THE INVENTION

Another way of expressing the novel process of this invention is to state that the invention is concerned with the recycle of FCC equilibrium catalysts. Thus, this invention resides in taking an FCC equilibrium catalyst, destroying the zeolite Y contained therein without destroying the matrix, and regrowing zeolite Y within the matrix to obtain an FCC catalyst having activity and selectivity necessary for commercial operation.

DESCRIPTION OF THE PREFERRED EMBODIMENTS

As is heretofore pointed out, the concept of treating an FCC equilibrium is not novel, nor is the concept of preparing zeolite Y from an equilibrium catalyst. What is unique in the novel process of this invention is that the necessary physical properties of the equilibrium FCC catalyst are preserved. As can be appreciated, as the FCC catalyst passes through the multiple cycles of regeneration and cracking, its physical properties actually improve due to the fact that the catalyst is continuously being abraded and fines are being removed in normal FCC commercial operation.

Strictly from a physical property point of view, an FCC equilibrium catalyst has the ideal physical properties. However, from a chemical point of view, the catalyst is so depleted in activity and selectivity that it is no longer useful as an FCC catalyst. Thus, the concept of removing the zeolite Y from an equilibrium catalyst, while preserving those desirable physical properties, and then regrowing new zeolite Y into the recovered material is believed to be unique and of tremendous economic significance.

Zeolite Y is well known in the art and the techniques for growing the same from sources of silica and alumina are also well known. Thus, for example, U.S. Pat. No. 3,130,007, as well as British Patent 1,342,977, contain typical methods for the preparation of zeolite Y.

The novel process of this invention is carried out by treating a zeolite Y-containing equilibrium catalyst with a source of sodium oxide, a source of silica and clear amorphous seeds and optionally a source of aluminum at elevated temperatures in order to destroy the Y and regrow the same to a level no higher than 70% by weight in its as-synthesized form. It is preferred that the zeolite Y be regrown in its as-synthesized form at levels ranging from 10 and 60 wt. %.

The source of sodium oxide is preferably sodium hydroxide. The source of silica is preferably silica, sodium silicate or sodium disilicate (SDS) or clay (preferably kaolin).

The seeds which are used are clear seeds as opposed to cloudy or gelled seeds, amorphous to X-ray and are described in U.S. Pat. No. 4,631,262, the entire disclosure of which is herein incorporated by reference. The seeds are used in the form of an aqueous solution containing silica, alumina and soda. Typical seed solutions range from 13-18 wt. % $SiO_2$, 10-14 wt. % $Na_2O$, 0.5-2.90 $Al_2O_3$, balance water.

The amount of materials used ranges from 20 to 40 grams of aqueous seed solution; from 20 to 50 grams of sodium oxide and from 25 to 75 grams of silica per 100 grams of equilibrium catalyst. The amount of water used is not narrowly critical and ranges from 50 to 400 grams per 100 grams of equilibrium catalyst.

The novel process is carried out by mixing the equilibrium catalyst with the seed solution, silica source, sodium oxide source and water. The order of addition is not critical.

The mixture is then heated to temperatures ranging from 160°-230° F. for periods of time ranging from 6 to 30 hours. The mixture can be treated at lower temperatures, i.e., 90°-120° F. for periods of time ranging from 6 to 48 hours or more and then raised to said higher temperatures. Such treatment at lower temperatures is not necessary.

Quite obviously, the above procedure results in the preparation of zeolite Y-containing materials wherein the Y is in the sodium form.

As is well known in the art, to prepare a FCC catalyst, sodium is exchanged with other ions including hydrogen ions, ammonium ions, rare earth ions or mixtures thereof and then calcined. Such techniques are well known in the art and are mentioned in numerous patents including U.S. Pat. No. 4,493,902.

It is to be understood that the above set forth parameters are critical with regard to obtaining a catalyst useful for FCC.

As will be shown in the Examples, if the amount of seeds is too high, too much zeolite Y is grown and the catalyst loses the physical properties necessary for FCC operation. If the seeds are not clear but gelled or cloudy, an inferior product results.

The following examples will illustrate the best mode contemplated for practicing the invention.

EXAMPLE 1

The purpose of this example is to illustrate that the equilibrium catalyst treated in accordance with the novel process of this invention involves the complete destruction of any residual zeolite Y.

An equilibrium FCC catalyst containing zeolite Y was obtained from Engelhard's Refinery Return Program. This material is used as received from the refiner and is not pretreated in any way. The material supplied by Davison is identified as XP-75.

In all the examples which follow, whenever an equilibrium catalyst is referred to by a designation including the manufacturer, it refers to the material which had been shipped to a refinery and then returned after being removed from the cracking process as an equilibrium catalyst.

Sixty-six grams of equilibrium XP-75 were placed in a pot equipped with a mixer and a teflon stirrer. Ninety grams of distilled water and 8 grams of sodium hydroxide were added, the pot was equipped with a lid, a thermal coupler and a controller. The slurry was brought to a temperature of 205° F. and held there for 2 hours. It was then filtered, dried and submitted for testing.

The zeolite index of the starting equilibrium XP-75 was about 15, while the zeolite index of the leached material was 0. The starting material had a surface area of 90 sq. meters per gram and a matrix surface area of 81 sq. meters per gram, while the leached material had a zeolite surface area of 2 sq. meters per gram and a matrix surface area of 8 sq. meters per gram.

Example 1 conclusively demonstrates that the Y zeolite which is contained in the equilibrium FCC catalyst treated in accordance with the novel process of this invention is destroyed rather than preserved as is practiced in many prior art procedures.

EXAMPLES 2-6

These examples will illustrate that it is fairly easy to grow zeolite A from equilibrium catalysts. As can be appreciated, zeolite A is outside the scope of this invention since catalysts containing this zeolite are not suitable for FCC operations.

Examples 2-6 were carried out in in situ reaction pots equipped with an overhead stirrer, heating mantle and programmable controller. The procedure involved treating the equilibrium catalyst with a sodium aluminate solution made by dissolving alumina and concentrated sodium hydroxide solution. This sodium aluminate solution analyzed as 23 wt. % $Na_2O$, 17 wt. % $Al_2O_3$ and the balance water. Equilibrium catalysts, sodium aluminate and sodium hydroxide were added to the reaction pot and then programmed to soak at 100° F. for 16 hours and the temperature raised to 180° F. over the course of 30 minutes and then held for 24 hours. The product of each example was then filtered, dried for at least 2 hours at 110° C. and examined by X-ray analysis. The results are given in the following table.

TABLE

| Example | Equilibrium Catalyst | NaOH (grams) | Sodium Aluminate (grams) | Water (grams) | ZI |
|---|---|---|---|---|---|
| 2 | FX-477 | 25 | 33 | 225 | 50 |
| 3 | FX-477 | 25 | 49 | 225 | 55 |
| 4 | FX-477P | 25 | 49 | 225 | 80 |
| 5 | XP-75 | 25 | 49 | 225 | 60 |
| 6 | XP-75T | 25 | 49 | 225 | 75 |

In the above table, FX-477 refers to a Y-containing equilibrium catalyst manufactured by Filtrol and XP-75 is the Y-containing equilibrium catalyst of Example 1. The designation P in Examples 4 and 6 indicates that prior to treatment the equilibrium catalyst was pulverized in a ball mill to −325 mesh prior to use in the zeolite A preparation. ZI (zeolite index) is determined by X-ray. As can be seen, it was fairly easy to prepare materials having a high zeolite content, i.e., about 50% or higher, when the zeolite was zeolite A.

EXAMPLES 7-15

These examples will illustrate that it is not possible to prepare zeolite Y in the pores of an equilibrium catalyst without the use of seeds. In these examples, various equilibrium catalysts were placed in an in situ reaction pot equipped with an overhead stirrer, heating mantle and programmable controller. The catalysts were treated with sodium hydroxide and a source of silica. The silica used was a 60–200 mesh grade 12 $SiO_2$ obtained from the Aldrich Chemical Company. The surface area of the silica was about 600 sq. meters per gram. The procedure involved adding the catalyst, the sodium hydroxide, the silica and water, soaking at 100° F. for the hours listed in the table which follows and finally soaking at 180° C. for the number of hours listed in the following table. By way of comparison, Example 7 is a standard Engelhard preparation for preparing a zeolite Y-containing material. It was not an equilibrium catalyst. The specific treatments are listed in the following table.

TABLE

| Example | Catalyst | NaOH | $SiO_2$ | $H_2O$ | 100° F. | 180° F. | ZI |
|---|---|---|---|---|---|---|---|
| 7 | 100 g MS-1 | 25.09 | 0 | 130 | 6 | 24 | 20 |
| 8 | 50 g A | 12.2 g | 0 | 48 | 6 | 24 | 0 |
| 9 | 50 g B | 12.5 g | 3 | 48 | 6 | 24 | 0 |
| 10 | 50 g B | 12.5 | 6 | 48 | 6 | 24 | 0 |
| 11 | 50 g B | 12.5 | 6 | 48 | 12 | 24 | 0 |
| 12 | 50 g B | 12.5 | 6 | 48 | 6 | 24 | 0 |
| 13 | 30 g B | 9.5 | 6 | 48 | 6 | 24 | 0 |
| 14 | 50 g C | 12.5 | 6 | 75 | 48 | 24 | 0 |
| 15 | 50 g C | 12.5 | 6 | 75 | 48 | 24 | 0 |

A is a zeolite Y-containing equilibrium catalyst identified as "Advance" and marketed by Ketjen.
B is a zeolite Y-containing equilibrium catalyst identified as "HRO-575" and marketed by Filtrol Corporation.
C is a zeolite Y-containing equilibrium catalyst identified as "Octacat" and marketed by Davison Chemical Co.

The above table clearly shows that zeolite Y could not be grown in equilibrium catalysts (Examples 8–15) in the absence of seeds, although zeolite Y could be grown from standard calcined kaolin, i.e., in Example 7. The above data also confirms Example 1 since it shows that the zeolite Y of equilibrium catalysts was destroyed in the treatment.

EXAMPLES 16-21

The following examples will illustrate the novel process of this invention wherein an equilibrium catalyst is treated with sodium hydroxide and a source of silica and seeds in order to grow zeolite Y into the support. The examples also demonstrate the criticality of the process parameters.

In Examples 16–20, an equilibrium catalyst was contacted with seeds, sodium disilicate (SDS), sodium hydroxide and water. The reactions were run in an in situ reaction pot equipped with an overhead stirrer, heating mantle and programmable controller. The sodium disilicate analyzed as 27 wt. % $SiO_2$, 14.1 wt. % $Na_2O$ and 0.1 wt. % $Al_2O_3$, the balance being water. It is understood that other sources of silica such as N-Brand ® can be substituted by making needed adjustments in water and caustic conditions.

The seeds were prepared in accordance with the procedure disclosed in U.S. Pat. No. 4,631,262, the entire disclosure of which is herein incorporated by reference. The analysis of the seeds was 17 wt. % $SiO_2$, 13.1 wt. % $Na_2O$, 1.0 wt. % $Al_2O_3$, the balance water. Clear seeds were used in Examples 20 and 21, and gelled or cloudy seeds were used in Examples 16–19.

The ingredients were added and programmed to ramp to 205° F. over 30 minutes and then soak for 16 hours. The preparations were then filtered, dried at 110° C. overnight and analyzed. The following table summarizes the results of Examples 16–21.

TABLE

| Example | Catalyst | Seeds | SDS | NaOH | $H_2O$ | ZI | +270 | −270 |
|---|---|---|---|---|---|---|---|---|
| 16 | 125C | 36 g | 220 | 16 | 100 | 31 | 115 | 60 |
| 17 | 125C | 36 g | 220 | 17 | 100 | 27 | 121 | 54 |
| 18 | 125C | 175 g | 150 | 3 | 80 | 71 | 0 | 221 |
| 19 | 125D | 350 g | 0 | 0 | 100 | 70 | 0 | 226 |
| 20 | 125C | 36 g | 220 | 16 | 180 | 35 | 158 | 9 |
| 21 | 125CP | 36 g | 220 | 16 | 180 | 70 | 0 | 190 |

In the above table, catalyst C is the same as previously identified in Examples 14 and 15. The designation CP means that catalyst C was pulverized. Catalyst D is the catalyst which was used in Example 1.

As can be seen from the above results, zeolite Y can either be grown in solution (−270) or in situ (+270) depending on the type and the amounts of seeds used. Further, Examples 18 and 19 show that high yields of zeolite Y are best obtained from heavily seeded preparations. The problems with preparations 18 and 19 is that the powders produced are not suitable as FCC catalysts unlike the preparation of Example 20. The products of Examples 16 and 17 are a mixture of microspheres and fines. The microspheres are converted to only 20% zeolite (vs. 35% for Example 20). While the powder is high in zeolite (zeolite index=45), this product mixture is useless for FCC because the activity of the microspheres with only 20% zeolite is inadequate and the powder does not function as a catalyst.

Example 21 is included to show that the zeolite yield can be doubled simply by pulverizing the starting catalyst so that less reactive materials can be consumed by the crystallization reaction. In other words, pulverizing or using increased levels of seeds both result in unwanted conversion of the more stable catalyst matrix into zeolite powder thereby rendering it useless for FCC processing.

EXAMPLES 22-27

These examples will illustrate the preferred procedure for carrying out the novel process of this invention.

In Examples 22-27, various equilibrium catalysts were treated with clear seeds, sodium disilicate, sodium hydroxide and water according to the general procedure set forth in Examples 16-21. The reaction was carried out in the same in situ reaction pot equipped with an overhead stirrer, heating mantle and programmable controller. The SDS utilized analyzed 27 wt. % $SiO_2$, 14.1 wt. % $Na_2O$, 0.1% $Al_2O_3$, the balance water.

It is to be understood that other sources of silicate such as N-Brand ® can be substituted by making the needed adjustments in water and caustic.

Seeds were prepared in accordance with aforementioned U.S. Pat. No. 4,631,262 and the seeds analyzed as 17. wt. % $SiO_2$, 13.1 wt. % $Na_2O$, 1.08 $Al_2O_3$ and the balance water.

The various ingredients were mixed and programmed to ramp to 205° F. over 30 minutes and then to soak for 16 hours. The catalyst was filtered, washed with twice its weight of distilled water and submitted for analysis.

The following table lists the actual experiments carried out.

TABLE

| Example | Catalyst | Seeds | SDS | NaOH | $H_2O$ | ZI | Name |
|---|---|---|---|---|---|---|---|
| 22 | 125 | 36 | 220 | 15 | 160 | 25 | FSS-2DY |
| 23 | 125 | 36 | 220 | 15 | 160 | 25 | FSS-2DY |
| 24 | 125 | 36 | 220 | 16 | 160 | 30 | GXO-41 |
| 25 | 125 | 36 | 220 | 16 | 160 | 30 | FX-477 |
| 26 | 250 | 80 | 440 | 36 | 320 | 35 | Beta |
| 27 | 312 | 90 | 550 | 40 | 420 | 25 | Advance |

FSS-2DY is a Y-containing equilibrium catalyst marketed by Filtrol. GXO-41 is a Y-containing equilibrium catalyst marketed by Davison Chemical Company. FX-477 is a Y-containing equilibrium catalyst marketed by Filtrol. Beta is a Y-containing equilibrium catalyst marketed by Katalystiks. Advance is a Y-containing equilibrium catalyst marketed by Ketjen.

EXAMPLES 28-31

The product of Examples 22 through 25 were converted to finished FCC catalysts identified as Example 28-31 using ammonium exchanges, rare earth exchanges and calcinations. The procedure involved contact with a 54% ammonium nitrate solution at room temperature which had its pH adjusted to 3.00 by the addition of nitric acid. The resulting slurry was filtered, washed with deionized water and the ammonium exchange was repeated.

After drying overnight at 120° F., the catalyst was rare earth exchanged with a 26.5 rare earth nitrate solution at pH 3.25 for 1 hour at 80° C.

Calcination involved adding 1 gram of water for each 4 grams of catalyst at room temperature. The wet catalyst is packed in a deep bed in a small covered silica tray. The covered tray is placed in an oven preheated to 700° F. for 2 hours. After cooling, 1 gram of water for each 4 grams of catalyst is added and the procedure repeated but at 1112° F. The catalyst was then subjected to two more ammonium exchanges.

The physical properties of the FCC catalysts are listed in the following table.

TABLE

| Example | Ni | V | $Na_2O$ | REO | HgPV | HgSA | ZSA | MSA |
|---|---|---|---|---|---|---|---|---|
| 28 | 609 | 379 | 0.42 | 3.4 | .14 | 43 | 155 | 75 |
| 29 | 611 | 388 | 0.49 | 2.9 | .14 | 40 | 140 | 52 |
| 30 | 502 | ND | 0.49 | 2.4 | .10 | 25 | 169 | 55 |
| 31 | 279 | 418 | 0.59 | 2.5 | .14 | 49 | 156 | 75 |

Ni and V in ppm.
REO in wt. %.
HgPV is mercury pore volume expressed in cc/gm.
HgSA is surface area determined by mercury porosimetry in sq. m/gm.
ZSA is zeolite surface area in sq. m/gm determined by BET.
MSA is matrix surface are in sq. m/gm determined by BET.

The above catalysts were evaluated by MAT testing referenced in U.S. Pat. No. 4,493,902 at col. 3, lines 30-50. Included in the comparison are two commercial catalysts manufactured by Engelhard, identified as X-4834 and X-2312. These two comparative catalysts are fresh (but steamed), i.e., not recycled from spent equilibrium catalysts. X-4834 is a low (~less than 1%) re-exchanged ultra-stabilized Zeolite Y FCC catalyst. X-2312 is a high rare earth (~7%) exchanged Zeolite Y FCC catalyst. Results obtained are shown in the following table.

TABLE

| Sample | MAT Data | | | | | |
|---|---|---|---|---|---|---|
| | Act. | Gasol. | Gas | Coke | LCO | $H_2$ |
| 28+ | 2.3 | 52.4 | 13.2 | 4.0 | 19.3 | 0.07 |
| 29+ | 1.8 | 51.5 | 10.0 | 2.9 | 21.7 | 0.06 |
| 30+ | 2.3 | 51.7 | 13.7 | 4.0 | 20.2 | 0.05 |
| 31+ | 2.5 | 54.0 | 14.2 | 3.7 | 17.4 | 0.05 |
| X-4834* | 2.2 | 51.9 | 12.9 | 3.3 | 18.8 | 0.04 |
| X-2312* | 2.5 | 52.1 | 14.7 | 4.5 | 17.5 | 0.02 |

*Fresh catalysts, steamed in 100% steam at 1450° F. for 4 hours.
+Recycled catalysts, steamed in 90% steam, 10% air at 1450° F. for 4 hours.

The above examples show that materials equivalent to current commercial catalysts can be made from equilibrium FCC samples—in other words, using this procedure, equilibrium catalyst can be transformed back into an FCC catalyst of equivalent activity and selectivity to the originally purchased material. Further, this is possible over a wide range of rare earth levels. Increased levels of rare earth lead to recycled catalysts with substantially increased activities.

EXAMPLE 32

The material obtained in Example 29 was impregnated using the Mitchell Method with 500 ppm Ni and 500 ppm V. It was then steamed for four hours at 1450° F. with 90% steam and 10% air. The results of MAT testing are shown below.

TABLE

| Example | Act. | Gasol. | Gas | Coke | LCO | H$_2$ |
|---|---|---|---|---|---|---|
| 32 | 1.4 | 46.1 | 8.5 | 3.5 | 23.3 | 0.27 |

Compared with Example 29, Example 32 has very poor activity and selectivity. The H$_2$ yield has increased from 0.06 to 0.27, and the coke/activity ratio rose from 1.6 to 2.5.

From this example, it is clear that 500 ppm Ni and 500 ppm V have a large effect on the selectivity of the final catalyst. The steam aged recycled catalysts, despite having nearly 1,000 ppm metals, show selectivities that are equivalent to metals free, non-recycled, steam aged catalysts.

EXAMPLES 33-35

An equilibrium catalyst identified as "Octacat" (Davison Chemical Co.), an equilibrium catalyst identified as "GXO-41" (Davison Chemical Co.) and FX 477 (Filtrol) were treated in accordance with the procedure of Examples 22-26 and then base exchanged with ammonium ions and rare earth ions according to the procedure of Examples 28-31. All catalysts had a rare earth content of about 2 wt. %. A commercial catalyst identified as X-4834 marketed by Engelhard Corporation was used as a reference.

The Davison and Filtrol catalysts were split into thirds. Each third was impregnated by the Mitchell Method to the following metals.

| Level | Ni | V |
|---|---|---|
| ⅓ | 0 | 0 |
| ⅓ | 1000 | 2000 |
| ⅓ | 2000 | 4000 |

The impregnated samples were steamed at 1,450° F. for 4 hours in a mixture of 90% steam and 10% air.

Figure 4:
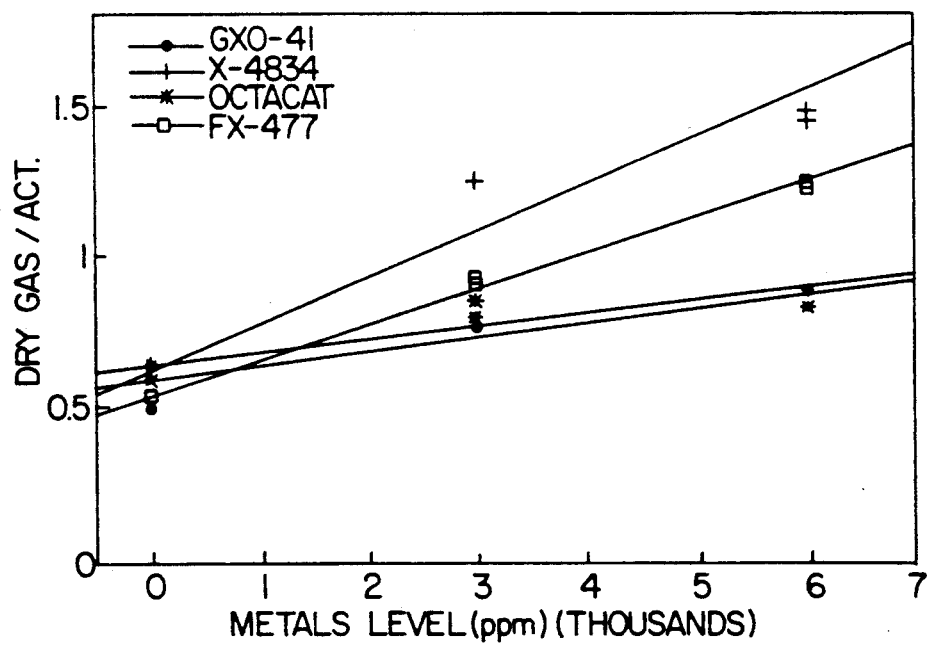

The steamed materials were then subjected to MAT testing and the results are shown in FIGS. 1-4.

As can be seen from FIGS. 1-4, the catalysts prepared by the process of this invention performed admirably well in comparison to the referenced X-4834 (non-equilibrium, but steamed).

EXAMPLE 36

An equilibrium catalyst identified as "FSS-2DY" (Filtrol Corporation) was demetallated by the following procedure. 350 g of catalyst was decoked by heating in air to 1100° F. for 3 hours. 300 g of the coke-free material was slurried with 90 g ethylenediaminetetraacetic acid (EDTA) and 600 mls deionized (DI) water. The slurry was brought to 200° F. and stirred for 4 hours. The solution was filtered, reslurried with 300 mls water, and brought to boiling three times. It was then placed in the oven and dried. Analysis showed that Ni was reduced from 870 to 580 ppm and the vanadium was reduced from 1030 to 640 ppm. Less than 1% alumina was leached from the catalyst.

EXAMPLE 37

125 g of the product of Example 36 was converted into sodium form catalyst using the same recipe and procedure used in Example 22, except 2 g of metakaolin were added to the preparation to replace some of the alumina lost during leaching. A zeolite index of 30 was achieved in the product.

The sodium form catalyst was converted into catalyst using the identical procedure used for Example 28. The analysis of the catalyst and the MAT results of the catalyst steamed for 4 hours at 1500° F., 90% stm, 10% air are given in the tables below.

TABLE

| Example | Ni | V | Na$_2$O | REO | HgPV | HgSA | ZSA | MSA |
|---|---|---|---|---|---|---|---|---|
| 37 | 530 | 333 | 0.35 | 2.5 | 0.20 | 45 | 188 | 97 |

TABLE

| Sample | Act. | Gasol. | Gas | Coke | LCO | H$_2$ |
|---|---|---|---|---|---|---|
| 37 | 2.4 | 52.8 | 13.8 | 4.0 | 18.8 | 0.10 |

It is clear to those practiced in the art that any method of selectively removing metals can be applied to the equilibrium catalyst before treating it in accordance with the novel process of this invention if it is felt that removing the metals is worthwhile.

EXAMPLE 38

This example will further illustrate the criticality of limiting the amount of zeolite Y grown in the equilibrium catalyst. If too much zeolite Y is grown, the matrix is damaged or destroyed such that the material loses its important physical properties and cannot be used for FCC.

2.7 g or NaOH were added to 1 liter crystallization kettle. 80 g of deionized (DI) water were added and the mixture stirred until the NaOH dissolved completely. 125 g of untreated, equilibrium XP-75 (marketed by Davison) were added. The kettle was equipped with an overhead mixer, a cover, and a heating mantle. 150 g of SDS (27.1% SiO$_2$, 14.4% Na$_2$O, 43.2% solids) was mixed with 175 g quenched faujasite seeds (22.3% SiO$_2$, 14.1% Na$_2$O and 63% H$_2$O) and added to the mixture. The controller was set to bring the kettle from the starting temperature (ca 90° F.) to 208° F. over the course of 30 minutes and then to hold at 208° F. for 24 hours. After 17.5 h, the preparation was filtered and washed with 250 ml of DI H$_2$O and then dried in the oven at 250° F.

The product material had a zeolite Y index of 70% by weight and a poor EAI of 2.02 (as determined by the procedure set forth in col. 6 of U.S. Pat. No. 4,493,900). The zeolitic surface area was 500 m2/g, the matrix (amorphous) surface area was 70 m2/g by BET. Before submitting for EAI, a 200/270 mesh fraction was separated and examined by light microscope. This examination verified that the zeolite had grown in situ into the equilibrium microspheres which maintained their original size and shape. However, it had lost the physical properties (attrition index) necessary for FCC.

EXAMPLE 39

This example will illustrate that the process of this invention is not applicable to amorphous cracking catalysts and is a repeat of Example 3 of British Patent 1,342,977. The equilibrium catalyst must be a crystalline zeolite Y-containing cracking catalyst in order to be useful in the novel process of this invention.

4.5 g of NaOH were added to a 0.5 liter crystallization kettle. 50 g of deionized (DI) water were added and the mixture stirred until the NaOH dissolved completely. 10 g of untreated, amorphous cracking catalyst (27% Al$_2$O$_3$, 73% SiO$_2$, BET surface area 350 m2/g) was added to the kettle which was equipped with an overhead mixer, a cover and a heating mantle. Next, 55 g of N-brand sodium silicate was mixed with 8 g quenched diluted faujasite seeds (22.3% SiO$_2$, 14.1% Na$_2$O, 0.5% Al$_2$O$_3$ and 63% H$_2$O) and added to the pot. The controller was set to bring the kettle from the starting temperature to 208° F. over the course of 30 minutes an then to hold at 208° F. for 24 hours. After 24 hours, the preparation was filtered and washed with 250 ml of DI H$_2$O and then dried in the oven at 250° F.

Approximately 10 g of material was recovered. The bulk density of the starting catalyst was 0.60 g/cc. The bulk density of the final product was 0.45 g/cc. X-ray analysis indicated that the material was approximately 80% zeolite Y. The zeolitic surface area was 460 m2/g, the matrix (amorphous) surface area was 50 m2/g, by BET. The material was subjected to the EAI attrition test. 66% of the material were lost during the test, indicating that the material is much too soft for use as an FCC catalyst.

The amount of NaOH added was adjusted to insure that the total sodium concentrate was identical to said British patent.

As can well be appreciated, another embodiment of this invention is to add a source of alumina to the equilibrium catalyst in order to raise the level of Y being regrown. The level of regrown Y must within the limits previously set forth.

What is claimed is:

1. A process for treating an equilibrium catalyst comprising zeolite Y and a matrix which comprises contacting the same at a temperature in the range of 160° to 230° F. with a source of silica, a source of sodium oxide, water and an aqueous solution of clear amorphous seeds in order to destroy the zeolite Y originally present in said equilibrium catalyst and to regrow zeolite Y in the matrix of said equilibrium catalyst to a level not exceeding 70 weight percent in the as-synthesized form while substantially preserving the physical properties of said matrix.

2. The process of claim 1 wherein the zeolite Y is regrown to a level of 10 to 60 weight percent.

3. The process of claim 2 wherein said sodium oxide source is sodium hydroxide.

4. The process of claim 2 wherein said silica source is sodium disilicate.

* * * * *